United States Patent
Ozonat et al.

(10) Patent No.: US 10,754,896 B2
(45) Date of Patent: Aug. 25, 2020

(54) TRANSFORMING A DESCRIPTION OF SERVICES FOR WEB SERVICES

(75) Inventors: Mehmet Kivanc Ozonat, Mountain View, CA (US); Sven Graupner, Mountain View, CA (US); Sujoy Basu, Sunnyvale, CA (US); Donald E. Young, Portland, OR (US)

(73) Assignee: MICRO FOCUS LLC, Santa Clara, CA (US)

( * ) Notice: Subject to any disclaimer, the term of this patent is extended or adjusted under 35 U.S.C. 154(b) by 1792 days.

(21) Appl. No.: 12/409,561

(22) Filed: Mar. 24, 2009

(65) Prior Publication Data

US 2010/0250515 A1  Sep. 30, 2010

(51) Int. Cl.
  *G06F 16/951* (2019.01)
(52) U.S. Cl.
  CPC ................. *G06F 16/951* (2019.01)
(58) Field of Classification Search
  USPC ........................................... 707/708
  See application file for complete search history.

(56) References Cited

U.S. PATENT DOCUMENTS

| | | | |
|---|---|---|---|
| 6,356,909 B1 * | 3/2002 | Spencer | G06Q 30/06 |
| 6,418,452 B1 * | 7/2002 | Kraft et al. | |
| 6,418,453 B1 * | 7/2002 | Kraft et al. | |
| 7,072,857 B1 * | 7/2006 | Calonge | G06Q 30/0601 |
| | | | 705/26.4 |
| 7,467,206 B2 * | 12/2008 | Moore et al. | 709/225 |
| 7,765,481 B2 * | 7/2010 | Dixon et al. | 715/738 |
| 7,870,188 B2 * | 1/2011 | Mazzitelli et al. | 709/203 |
| 2001/0032172 A1 * | 10/2001 | Moulinet | G06Q 40/04 |
| | | | 705/37 |
| 2001/0039529 A1 * | 11/2001 | Hoffman | G06Q 30/06 |
| | | | 705/37 |
| 2004/0098606 A1 * | 5/2004 | Tan | G06Q 30/02 |
| | | | 726/1 |
| 2004/0111525 A1 * | 6/2004 | Berkland et al. | 709/231 |
| 2004/0122926 A1 * | 6/2004 | Moore et al. | 709/223 |
| 2004/0220918 A1 * | 11/2004 | Scriffignano et al. | 707/3 |
| 2004/0260534 A1 * | 12/2004 | Pak et al. | 704/7 |
| 2004/0267876 A1 * | 12/2004 | Kakivaya et al. | 709/200 |
| 2005/0080768 A1 * | 4/2005 | Zhang et al. | 707/3 |
| 2006/0074980 A1 * | 4/2006 | Sarkar | G06F 17/3089 |
| 2006/0253579 A1 * | 11/2006 | Dixon et al. | 709/225 |
| 2007/0050201 A1 * | 3/2007 | Gardner | G06Q 30/0282 |
| | | | 705/1.1 |
| 2007/0156868 A1 * | 7/2007 | Keren et al. | 709/223 |
| 2007/0288473 A1 * | 12/2007 | Mukherjee | G06F 17/30876 |
| 2008/0065656 A1 * | 3/2008 | Theeten et al. | 707/100 |
| 2009/0119268 A1 * | 5/2009 | Bandaru et al. | 707/3 |
| 2011/0161319 A1 * | 6/2011 | Chunilal | 707/733 |
| 2014/0039966 A1 * | 2/2014 | Browning | G06Q 30/02 |
| | | | 705/7.25 |

OTHER PUBLICATIONS

Basu et al., Service Selection in Business Service Ecosystem, LNCS 5472, Dec. 2008, pp. 256-269.

* cited by examiner

*Primary Examiner* — James Trujillo
*Assistant Examiner* — Kurt A Mueller (57) ABSTRACT

One embodiment is a method that receives a description of services desired by a service requestor and then crawls web sites to extract information on services offered by service providers. The extracted information is used to transform the description of services desired by the service requestor into an improved description of services.

13 Claims, 4 Drawing Sheets

TRANSFORMING A DESCRIPTION OF SERVICES FOR WEB SERVICES

CROSS-REFERENCE TO RELATED APPLICATIONS

This application relates to the following patent applications which are filed concurrently herewith and incorporated herein by reference: U.S. application Ser. No. 12/409,550, U.S. Publication No. 2010/0250396, entitled "Populating a Service Registry with Web Content" and U.S. application Ser. No. 12/409,555, U.S. Pat. No. 9,159,090, entitled "Building a Standardized Web Form."

BACKGROUND

Service providers are businesses that provide subscription or web services to other businesses and individuals. Typically, service providers have a presence on the World Wide Web (web) through which they describe and offer their services. Users or service requestors navigate through web pages to obtain information about services being offered.

Web services can be complex and include, for example, multiple service properties with various costs and options. Service requestors are often not aware of all these different service properties and options. When a service requestor is searching for a service provider, the service requestor may not be as knowledgeable as the service provider in articulating all the specifications necessary for obtaining the desired services.

As a result of this lack of knowledge on the part of the service requestor, the specifications of the desired services can be incomplete. Additionally, service options readily available from the service provider may not be known to the service requestor, and such options can be overlooked even if they are desirable for the service requestor.

The lack of specification can result in delays in executing the services and result in the service requestor receiving unsatisfactory or incomplete services from the service provider.

DETAILED DESCRIPTION

Exemplary embodiments in accordance with the invention include apparatus, systems, and methods that enhance service requestor requirements based on descriptive information and properties from web sites of service providers.

Figure 1:
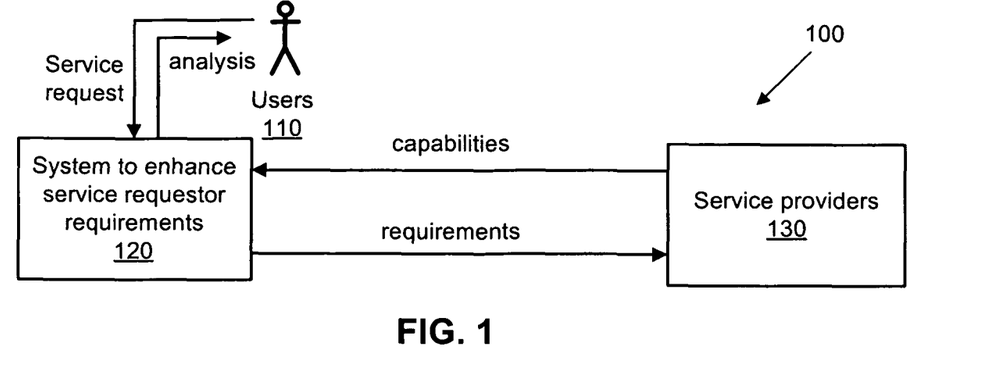
FIG. 1 shows a high-level diagram of a system that uses information obtained from web sites of service providers to assist service requesters in determining services that the service requesters desire in accordance with an exemplary embodiment of the present invention.

FIG. 1 shows a high-level diagram of a system 100 that uses information obtained from web sites of service providers to assist service requestors in determining services that the service requestors desire. Systems and methods in accordance with FIG. 1 automatically derive and feedback concepts and questions from numerous service providers to enhance specifications of a user's requirements (i.e., the services being sought by the user or service requester). One exemplary embodiment leverages existing search engines and provides a layer of value above them.

As shown in FIG. 1, one or more users 110 input or provide service requests to a system to enhance service requester requirements 120. In turn, this system 120 provides the service requests or description of services (i.e., requirements) to one or more service providers 130. The service providers 130 then provide information on available services (i.e., capabilities) back to the system to enhance service requestor requirements 120. The system 120 analyzes the capabilities of the service provider and compares these capabilities with the requirements desired by the user. Results of this analysis (i.e., output) are provided to the user.

In one exemplary embodiment, the outputs are used to enhance or improve the initial description of services and/or provide more knowledge about available services to the service requestor. For example, the output transforms the initial description of services into an improved or enhanced description of services for the service requestor. When a service requestor is searching for a service provider, the service requestor may not be as knowledgeable as the service provider in articulating all the specifications necessary for obtaining the desired services. The output provides knowledge to the service requestor and assists in modifying, transforming, or improving the specifications for obtaining the desired services. For example, the service requestor learns of additional service options available from the service providers. These additional service options were not previously known to the service requestor prior to receiving the output from the system 120. Based on these additional service options, the service requestor can refine the specifications (i.e., description of services) for obtaining the desired services from the web service providers.

A number of different outputs are generated based on options selected by the user or service requestor. By way of example, these outputs include, but are not limited to, one or more of the following: 1) a listing of common or important terms for the services being requested; 2) an ontology highlighting the typical dimensions and the choices available for various services offered for the services being requested, and 3) web forms representing a composite of questions typically asked by service requestors for the services being requested. In one exemplary embodiment, these outputs are interpreted by a human or made available to a machine/computer for further processing.

Figure 2:
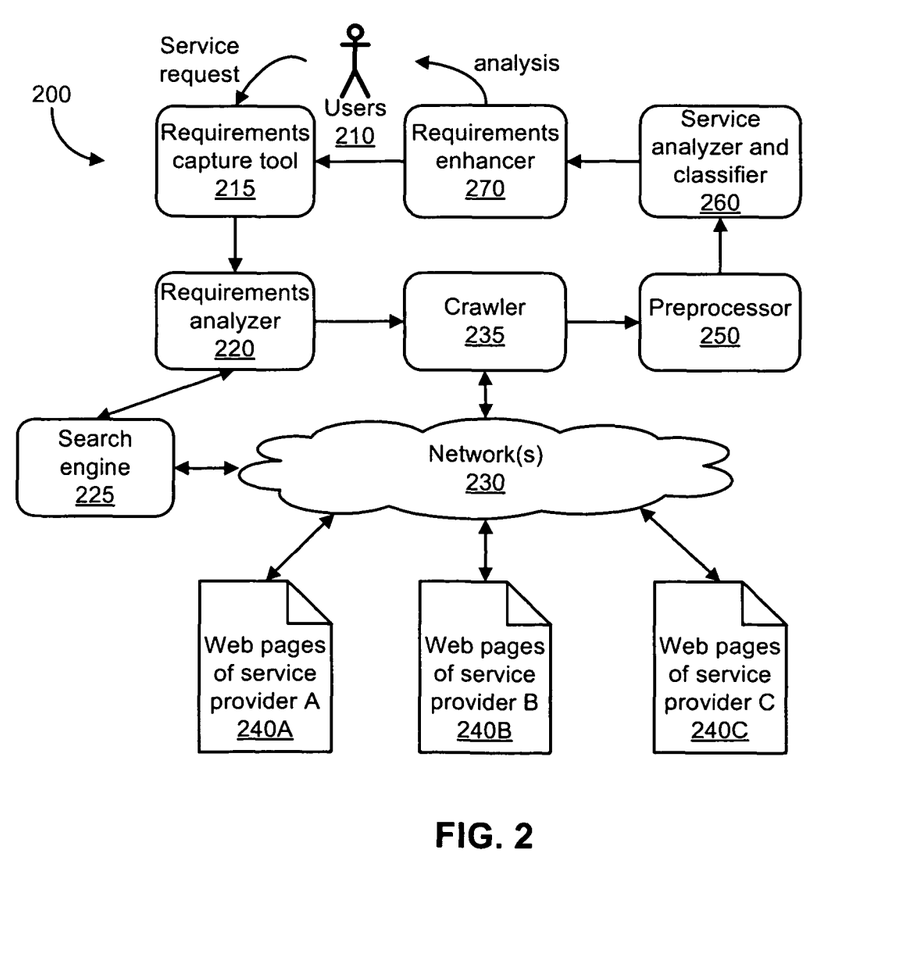
FIG. 2 shows a detailed diagram of a system that uses information obtained from web sites of service providers to assist service requestors in determining services that the service requesters desire in accordance with an exemplary embodiment of the present invention.

FIG. 2 shows a detailed diagram of a system 200 that uses information obtained from web sites of service providers to assist service requestors in determining services that the service requesters desire in accordance with an exemplary embodiment of the present invention.

Figure 3:
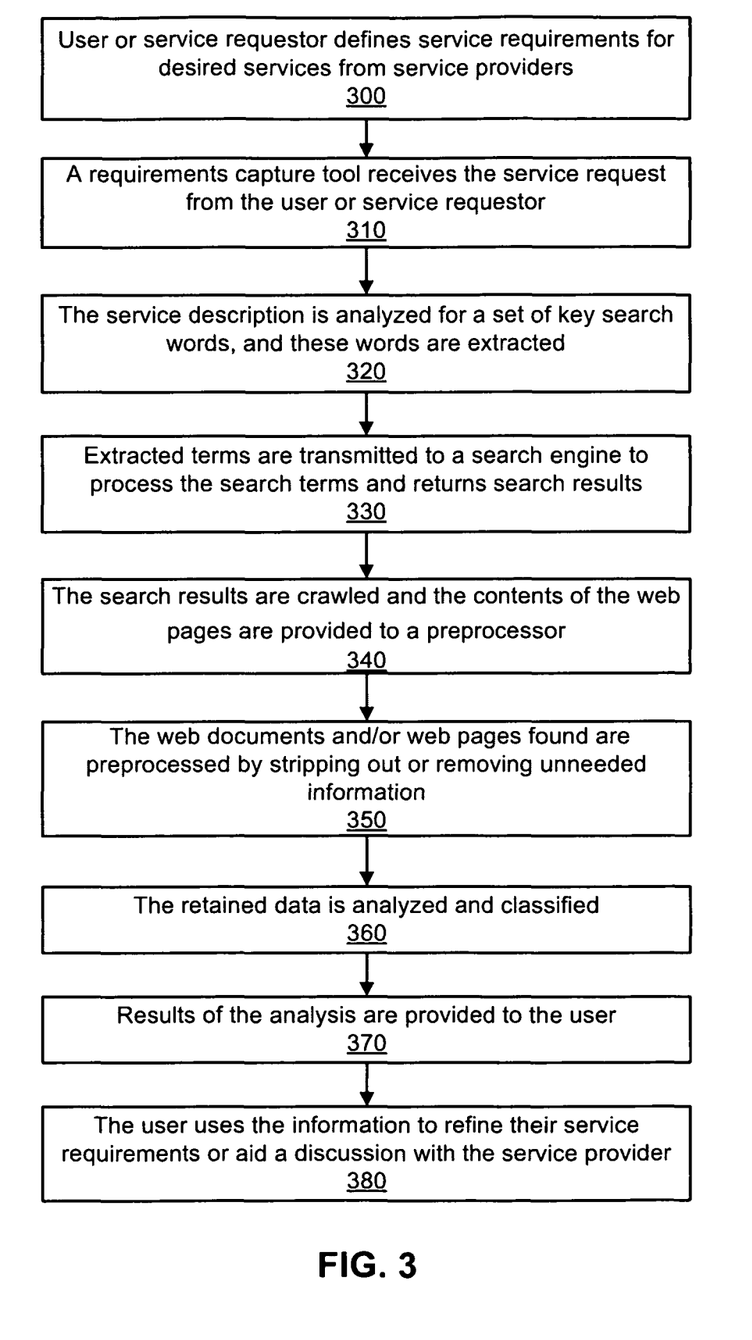
FIG. 3 is a flow diagram of a method that uses information obtained from web sites of service providers to assist service requestors in determining services that the service requesters desire in accordance with an exemplary embodiment of the present invention.

FIG. 3 is a flow diagram of a method that uses information obtained from web sites of service providers to assist service requesters in determining services that the service requestors desire in accordance with an exemplary embodiment of the present invention.

FIGS. 2 and 3 are discussed together.

According to block 300, one or more users or service requestors define service requirements for desired services from one or more service providers. The user 210 provides a service request to the requirements capture tool 215. For example, a user specifies to the best of their knowledge the general requirements for a service that a service provider can perform for the user.

According to block 310, a requirements capture tool receives the service request or service description from the user or service requester. For example, a requirements capture tool 215 captures the service requirements either through formal tools or a simple descriptive paragraph such as in a word processing document.

According to block 320, the service description is analyzed for a set of key search words, and these words are extracted. For example, if a user wanted a print service for brochures, examples of keyword would include printing services, brochures, price, etc.

The requirements analyzer 220 processes the requirements description looking for a set of key search terms and extracts such terms. One exemplary embodiment uses statistical learning techniques and cross correlation to a known set of requirements statements, such as an archive of printing request for quotes (RFQs).

According to block 330, the extracted terms are transmitted to an internet search engine 225. The search engine (such as GOOGLE or ALTA VISTA) searches one or more networks 230 (such as the internet), processes the search terms, and returns search results, such as discovering a set of uniform resource locators (URLs). The search results (for example, URLs) are transmitted to the requirements analyzer 220 which, in turn, provides the results to a crawler 235.

For example, the search engine discovers web sites of service providers that provide or offer services described by the extracted keywords.

According to block 340, the search results are crawled and the contents of the web pages are provided to a preprocessor 250. For example, a web crawler 225 takes a set of URL's and references them by crawling the internet and bringing back the actual content of the URL's. Web pages of the service providers 240A, 240B, and 240C are crawled to extract information on services being offered. These results are stored and transmitted to the preprocessor 250 for further processing. One can adjust the amount of "link following" that is performed, typically limiting it to the domain of current interest.

According to block 350, the web documents and/or web pages found are preprocessed by stripping out or removing unneeded information, such as formatting (e.g. table, font etc) and keeping the richest set of provider descriptive material, such as in web forms. For example, the preprocessor 250 strips out unnecessary information (for example, tables, fonts, formatting, etc.) but retains service provider descriptive material, such as in web forms. It retains structure such as maintaining "select options" and radio button choices.

According to block 360, the retained data is then analyzed and classified. The information represented on the various web documents and web pages of the result set is then represented as an output of different levels of detail, such as a list of terms, an ontology, or a normalized form of questions.

For example, the service analyzer and classifier 260 analyzes and classifies the information represented on the various pages of the result set. It looks across pages and discovers commonalities and relationships between the sites collected. It refines the grouping of service providers inherent in the results of the search engine and looks across all of the providers in the result set. The service analyzer and classifier 260 discovers similarities, such as the types of form questions they ask or the terminology used, and finds commonality across these similarities through the application of statistical techniques. Its input is provided from multiple sites, and its output is a summarization of the combined data. Exemplary outputs include, but are not limited to, the following:

(1) A list of terms used by the majority of service providers in that class.
(2) An ontology showing the relations and properties of the form data, such as questions and alternative answers/choices used by the majority of service providers in that class.
(3) A normalized canonical form of questions that most service providers of this class ask.

According to block 370, based upon knowledge of the initial requirements, the requirements enhancer 270 presents (such as displaying on a display) the user with the differences between the user's initial request and the results of the search.

According to block 380, the user uses the information to refine their service requirements or aid a discussion with the service provider.

For example, the requirements enhancer 270 compares the initial requirements, which it gets from the requirements analyzer, to the output of the service analyzer. This comparison is presented to the user to illustrate the differences between their initial request and the results of the service analyzer and classifier 260. The user can then decide how much of this information they want to use to refine their requirements or assist in obtaining their desired services. The user is thus able to use the comparison to make a decision of what should or should not be in a refinement of the requirements for services.

In one exemplary embodiment, the user is provided with an ordered list of service providers that best meet the requirements for services desired by the service requestor. An improved description of services can also be used to iterate through the process again. Furthermore, the improved description of services is used to more quickly and completely engage with service providers since the specification dimensions needed by the service provider are identified and addressed by the service requestor.

With exemplary embodiments, requirements of a service requestor are enhanced by automatically analyzing a community of web sites of service providers and then providing this information back to the service requestor. This process takes minutes or even less, rather than hours of human labor. The service requestor can now make the specifications more complete and in tune with the need of the service provider for accurate information. Also, information that was previously unknown to service requesters can now be obtained, analyzed, and used. This speeds up the engagement process and improves the quality of output as perceived by the service requestor.

Exemplary embodiments in accordance with the invention provide solutions to the service selection problem: How to find and select services offered by service providers that best meet the requirements described by a service seeker. On one side, the service seeker provides a description of requirements or desired service properties. On the other side, service providers describe their capabilities. In general, this is a two-step process. In the first step, a set of service provider candidates, which generally meet requirements (not necessarily all requirements), are identified. Requirements are described as a set of desired service properties. In the second step, the "best" service provider is selected from the candidate set based on a "best match" between the properties exposed by the service provider and those requested by the service seeker. In order to solve the service selection problem, a common base is established between the descriptions of desired service properties on one side and descriptions of service capabilities on the other. This common base can be strong and formal, such as being defined by service description frameworks with pre-defined syntactic and semantic constructs for expressing service properties and query and matchmaking capabilities built on top of it. A service registry is an example of a system which defines a service description framework.

Many service offerings, however, do not include a formal service description framework, such as service offerings being described in natural language in marketing collateral, web content, or advertisements. The same applies at the service seeker's side: most documents that describe what a person is looking for are expressed in (largely) unstructured formats. An unstructured format often exists on the web as a significant medium through which service offerings are promoted and advertised as well as sought and found. Consequently, embodiments in accordance with the present invention provide solutions to the service selection problem in unstructured environments, such as the web.

The following discussion provides more examples of exemplary embodiments within the context of several types of web services, namely telemarketing, printing, and litigation. These specific web services are provided for discussion and should not be interpreted as limiting embodiments to which exemplary embodiments in accordance with the invention can be practiced. For convenience, the discussion is provided with headings.

Overview

A world-wide community of service providers has a presence on the web, and people seeking services typically go to the web as an initial place to search for them. Generally, service selection is comprised of two steps: finding service candidates using search engines and selecting those which meet desired service properties best. Within the context of web services, the service selection problem can be solved through common description frameworks that make use of ontologies and service registries. The majority of service providers on the web, however, does not use such frameworks and rather makes service descriptions available on their websites that provide human targeted content. Exemplary embodiments apply to the service selection problem when the service description framework does not exist and services are selected using the more unstructured information available on the web.

Exemplary methods described in the following embodiments include one or more of the following steps. Search engines are employed to find service candidates from dense requirement formulations extracted from user input. Text classification techniques are used to identify services and service properties from web content retrieved from search links. Service candidates are then ranked based on how well they support desired properties. The rankings are provided to the search requestor to assist in analyzing or obtaining web services. Alternatively, the rankings can be provided to a computer for storage and further processing.

Assumptions

The service selection problem is addressed from the perspective of a seeker or requester of services, such as a user in a corporate or private environment. It is assumed that someone (a person) in the service seeker's role informally knows about a task to be given to a service provider and that a description (such as a textual or verbal description) of desired service properties exists. One form of expressing these properties is documents, such as a statement-of-work (SOW), a request-for-proposal (RFP), or a request-for-quote (RFQ) document that are uses to procure external services. A sample set of these documents is used for identifying desired service properties.

It is furthermore assumed that service providers have presences on the web (web sites) where they informally describe and advertise their capabilities and that those web pages can be found through search engines. While it is assumed that informal descriptions about service providers can be obtained from the web, it is not assumed that the actual business interaction also is mediated over the web. For example, a legal counseling agency may be found on the web, but actual counseling then occurs in person. We explore service providers' web content and classify its properties.

Problem Statement

Based on these assumptions, exemplary embodiments address and provide solutions to at least the following problem statements:

1. Can sought service properties (requirements) be gathered informally from a person in a service seeker role and represented in a condensed descriptive vector of meaningful terms?
2. Can these terms then be used in search engines to find service provider candidates? This includes that service providers are distinguished from other content returned from search.
3. Can service properties be extracted and classified from service providers' web content (their web sites)?
4. Can properties from service seeker's requirements and service provider's capabilities be correlated such that providers can be ranked based on how well they support requirement properties?

The first two problem statements relate to "how to find service candidates"; the last two address the matchmaking aspect of the service selection problem.

Approach

The approach includes the following four steps, each addressing one of the above problem statements:

The first step condenses the information people use informally when communicating service requirements. The goal is to identify the essential terms from documents which describe required service properties. Forms and questionnaires are familiar to a business audience and a good way to produce dense information for procuring external services. An example illustrates this approach. For a marketing campaign at a larger customer event, a service provider may be sought which can "print quantity 2,000 colored 8.5×11 z-fold brochures, 100 lb. gloss within 10 days with maximum budget of $1,000". This string represents a condensed form of a statement of work document and the essence of desired service properties. A Singular Value Decomposition (SVD) technique is used to extract these terms from a representative set of documents. This step results in a descriptive vector of meaningful words representing the essence of required service properties.

The second step is to use these meaningful words in search engines and to obtain a pool of links to potential service candidates. Since links returned from the search may refer to any content, which may or may not be service providers, links are followed and content obtained from links in order to determine whether or not such link content represents a service provider. If content could be successfully probed and classified as representing a service provider, the service provider is added to the pool of potential service provider candidates. For example, when the string above is typed into the GOOGLE search engine, it returns eleven sponsored links of print service providers (in the U.S.) and a number of random entries, which are more or less related to printing brochures, but may or may not be service providers. Typically, in GOOGLE, it is sufficient to consider content returned with the first page. Other search engines such as ALTAVISTA may return different content.

Further sources of information about service providers can be involved, such as established service catalogs in order to obtain a larger candidate pool of service providers. These service catalogs collect structured information about businesses in the U.S. and worldwide and make this information available over the web.

The answer from search engines or service catalogs is used as a starting point to further explore whether or not a returned link represents a service provider. The second problem hence addresses whether or not a web site behind a link can be identified as a service provider. The approach here is to look for FORM pages encouraging users to engage with the service. This step results in a pool of potential service provider candidates.

Furthermore, in preparation of comparison, service properties are identified for candidates from their web content. The approach here uses meta-tags and content of online service engagement forms. Thus, this step also provides a set of service properties identified for each service.

Once the service properties have been extracted for the service candidates, they are compared and correlated with service properties from condensed requirements from the first step. Singular Value Decomposition (SVD) is an exemplary correlation technique. This results in a ranked list of service provider candidates with the top-ranked service provider supporting desired service properties.

Extracting Significant Words for Service Requirements

For input, one exemplary embodiment used twenty four Portable Document Format (PDF) documents from an internal marketing department, which are primarily request for quotes (RFQ) for various printing projects undertaken by a large enterprise typically through an entity known as the print concierge. The RFQs are normally sent to vendors.

Exemplary embodiments were used on these PDF documents to identify the list of terms representing the essence of required service properties. In order to accomplish this task, SVD was used.

SVD was applied to index the terms in a document and retrieve documents that match query terms. To begin, a matrix is created where the rows represent the terms and its columns represent the documents. An element of the matrix represents the frequency of a term in a document. SVD expresses this matrix X as the product of 3 matrices, T, S and $D^t$, where S is a diagonal matrix of singular values ordered in descending order, and T and D are the matrices of eigenvectors of the square symmetric matrices $XX^t$ and $X^tX$ respectively. Furthermore, the square of the singular values are the eigenvalues for both $XX^t$ and $X^tX$. The dimension of X is t (number of terms) by d (number of documents), while that of T is t by m, where m is the rank of X and is at most the minimum of t and d. S is a m by m matrix. Intuitively, SVD transforms the documents (columns of X) and the terms (rows of X) into a common space referred to as the factor space. The singular values in S are weights that are applied to scale the orthogonal, unit-length columns vectors of T and D and determine where the corresponding term or document is placed in the factor space. Similarity between documents or the likelihood of finding a term in a document can be estimated by computing distances between the coordinates of the corresponding terms and documents in this factor space. The eigenvectors corresponding to the highest eigenvalues represent principal components that capture the most important characteristics of the data. The contributions keep diminishing for descending eigenvalues. By dropping some of the lower eigenvalues and corresponding eigenvectors, we lose some information, but can reduce the dimensionality of the data. This is useful when the number of documents is very large. We can retain the k highest eigenvalues, and the corresponding eigenvectors in the T and D matrices. The product $T_{txk} S_{kxk} D_{tkxd}$ gives the unique matrix of rank k closest to X based on a least-square distance metric. Latent semantic indexing (LSI) is the process of using this matrix of lower rank to answer similarity queries such as which terms are strongly related and given query terms, and what are the related documents. LSI returns query matches with higher precision when synonyms or multiple word senses would have prevented syntactic matching.

This embodiment was subject to the following experiment. We use SVD on the term by document matrix obtained from our document set. The terms were single words, bigrams and trigrams. We filtered out stopwords and the long tail of words that occurred only once. We reduced the rank of the matrix to k chosen such that 99% of the sum of squares of the singular values, which is the sum of eigenvalues, is retained. Next, we take the product $T_{txk}S_{kxk}$ which consists of the eigenvectors weighted by their singular values. To extract important terms, we take the maximum absolute value in each row as the importance of that term, and sort based on this metric to order the terms by their descending importance. Given a threshold, our algorithm outputs all terms for which the metric, normalized to its maximum value, exceeds this threshold.

Since we need the ground truth to determine how well this approach works, we asked a human participant in our experiment to read the documents and identify important terms. To eliminate bias, this person had no a priori knowledge of the terms selected by our automated approach based on SVD and limited himself to manual analysis of the documents. He created a list of the top 20 important terms, henceforth referred to as the ground truth for this experiment. We started with the top 20 terms from the sorted list created by SVD, and progressively relaxed the threshold. At each stage, we calculated precision as the fraction of SVD's output that is present in the ground truth. We also calculated recall as the fraction of the ground truth that is present in the output of SVD. Our recall suffers due to our strategy of including all 2 and 3 letter words as stopwords. Thus the word 'ink', which is included in the ground truth, is absent from our term by document matrix. The same is true for terms such as "80# gloss" since we did not process any token such as "80#" that does not have at least one alpha character.

Figure 4:
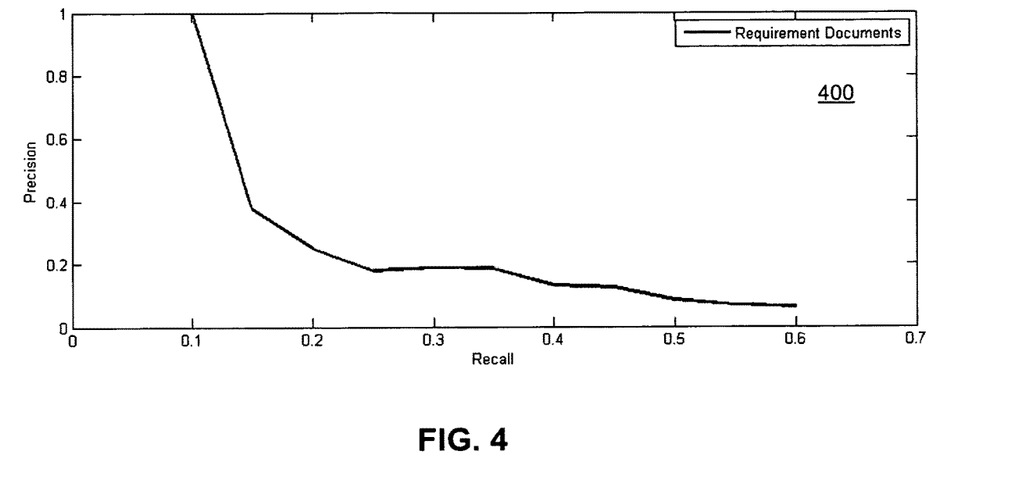
FIG. 4 is a chart showing variation of precision with recall as the threshold being varied in accordance with an exemplary embodiment of the present invention.

FIG. 4 is a chart 400 showing the variation of precision with recall as the threshold being varied. Precision drops from 1 to 0.25 when we relax our threshold progressively from 1 to 0.28. During this period, we observed only a small increase in recall to 0.2. The threshold was then relaxed progressively to 0.07. During this period, recall increased to 0.6, while precision dropped to 0.06.

Finding Service Candidates

We use a search engine (for example, ALTAVISTA) to find a pool of service providers through which the customer can engage in a business interaction over the web to meet service needs. We use phrases such as "telemarketing service", "printing service" or "copyright litigation service" as input to retrieve the service provider pages.

In order to populate the data set (of service providers), we randomly selected words under the WIKIPEDIA descriptions of the three services (telemarketing, printing and copyright litigation), and used them as input phrases to the search.

The pages retrieved by the search engine are filtered as we seek only web forms and only web forms that contain the properties and attributes of the offered services to initiate a business engagement. Thus, for each retrieved web page b the search engine, we retrieved the Hyper Text Markup Language (HTML) source of the page to filter the non-form pages (or non form sections of the form pages). We used the standard HTML tags that denote HTML form tags in order to filter out the non-form pages or non-form sections.

Identify Service Properties of Service Candidates

Once the pool of service providers (or, alternatively, the pool of forms, since there is a one-to-one mapping between forms and service providers) is determined, we seek to find the properties of each service type represented in the pool. For the experiments we conducted, there are three service types: telemarketing, printing and copyright litigation.

We denote each service type by m, each service providers (or form) by n, and each word used in the forms by w. We denote the number of service types, number of service providers, and the number of distinct words used in the forms by M, N and W, respectively. We note that the parameters N and W are pre-determined, since the pool of forms is already discovered. We assume that the service types m (and consequently the number of service types M) are known.

We use statistical learning techniques to identify properties of services based on the pool of service providers (or forms) retrieved. We employ both supervised and unsupervised learning techniques. In supervised learning, the service type of each service provider n is assumed to be known, while in unsupervised learning this information is missing.

Data representation: We model each service provider (or form) n by a sequence of W bits (sequence of 0's and 1's), where each bit represents whether a word is present in the form. If the bit is 0, the word is absent, and if it is 1, the word is present.

Unsupervised learning: Clustering is an unsupervised learning technique, where objects that are close under some distortion criterion are clustered in the same group.

Supervised learning: When the cluster labels of the objects are already available (i.e., the service type of each service provider is known), one can use a supervised learning technique. We model the data as a mixture of M (where M=3) W-dimensional Gaussians, and estimated the parameters each Gaussian using the sample averages of the forms in that cluster. We use the k-means clustering algorithm for supervised classification with the squared error distortion measure to cluster forms into M=3 groups. Each object to be clustered is a vector of 0's and 1's of length W, representing a form.

In total, 600 pages have been classified for this experiment for the three service categories with ~200 for each category. Of those pages, 122 are form pages.

Results: Supervised learning led to keywords that describe each service reasonably well. These words were selected based upon the probability of 50% or greater that the word will be found in all documents in the cluster. Table 1 below shows service properties for three service categories.

TABLE 1

| Service Category | Significant Keywords |
| --- | --- |
| Telemarketing | inbound, outbound, call, center, telemarketing, outsourcing, marketing, company, phone, address, zip, list |
| Printing | business, card, printing, format, color, folder, sample, presentation, text, quote |
| Litigation | intellectual, property, dispute, client, copyright, litigation, client, business, infringement, attorney, law, trial, website, competitor |

Rank Service Candidates

Input: In this step, we start with web pages of services identified from the web.

Objective: We seek an automated method, not based on domain-specific knowledge, which identifies the subset of the input services that match the required service properties of one of the requirement documents described above. Since multiple matches are expected, a rank-ordered list of the services is produced.

Technique: SVD is used to index the service descriptions and treat one of the requirement documents as a term vector with which a query is performed.

Experiment: SVD is used on the term by a document matrix obtained from the service web pages treated as documents. The HTML tags were removed. Again, we use single words, bigrams and trigrams as the terms. As before, we filtered out stopwords and the long tail of words that occurred only once. We reduced the rank of the matrix to k chosen such that 99% of the sum of squares of the singular values, which is the sum of eigenvalues, is retained. The term vector for the query is transformed into the factor space obtained by SVD. This involves multiplying the transpose of the term vector by the SVD term matrix $T_{txk}$. Intuitively, this gives the coordinates of the transform for this term vector in the factor space. It may be compared in this space to the other documents representing the services by accessing individual rows of the matrix product $D_{dxk}S_{kxk}$. For each row of this matrix product, we compute the inner product with the transform of the query term vector. Then we compensate for variable document sizes by normalizing the result by the product of the Euclidean length of the two vectors. The result is their cosine similarity, a standard measure for quantifying similarity of two documents in a vector space.

For our data, the human participant again established the ground truth without a priori knowledge of how SVD ordered the services. He did a manual evaluation of the requirement document used as query term vector. Based on his qualitative judgment, he provided us with a rank ordering of the services documents (HTML pages) in terms of how well they will meet the requirements specified in the query document.

Since SVD was used to generate cosine similarity of the service documents to the requirement document used for query, we ranked the services based on this metric. The correlation of two rank orders are quantified by the Spearman rank correlation coefficient, which ranges between +1 when both rank orders are identical to −1 when one rank order is 1, 2, 3, . . . , n and the other one is n, n−1, n−2, . . . , 1. The results are presented in Table 2, shown below.

TABLE 2

| Anonymized Service Names | Cosine Similarity | Cosine Rank | Manual Rank | d-squared |
|---|---|---|---|---|
| pitn-prt | 0.4848 | 7 | 1 | 36 |
| mpit-prt | 0.7469 | 2 | 2 | 0 |
| pitl-prt | 0.6404 | 3 | 3 | 0 |
| ppit-prt | 0.8149 | 1 | 4 | 9 |
| pitu-prt | 0.5275 | 5 | 5 | 0 |
| mkid-mlg | 0.51 | 6 | 6 | 0 |
| jsad-mlg | 0.5665 | 4 | 7 | 9 |
| pitn-mlg | 0.4564 | 9 | 8 | 1 |
| byro-tlm | 0.2363 | 12 | 9 | 9 |
| bbec-tlm | 0.182 | 13 | 10 | 9 |
| gtqo-tlm | 0.3634 | 10 | 11 | 1 |
| vnes-tlm | 0.4821 | 8 | 12 | 16 |
| spra-tlm | 0.3045 | 11 | 13 | 4 |
| il_o-lwr | 0.0505 | 17 | 14 | 9 |
| lwno-lwr | 0.1524 | 14 | 15 | 1 |
| cbrr-lwr | 0.134 | 15 | 16 | 1 |
| cmue-lwr | 0.0709 | 16 | 17 | 1 |

In the absence of shared ranks, the Spearman coefficient is simply $1-(6\Sigma d^2/n(n^2-1))$. From this table, $\Sigma d^2$ is 106 and n=17. So the Spearman coefficient is 0.87 for our experiment, indicating very high correlation.

In Table 2 we compare the service ranks obtained manually and through SVD for three service categories: printing, telemarketing and legal services. This table illustrates a comparison of service ranks obtained manually and through SVD for three service categories: printing (prt), telemarketing (tlm) and legal services (lwr).

Figure 5:
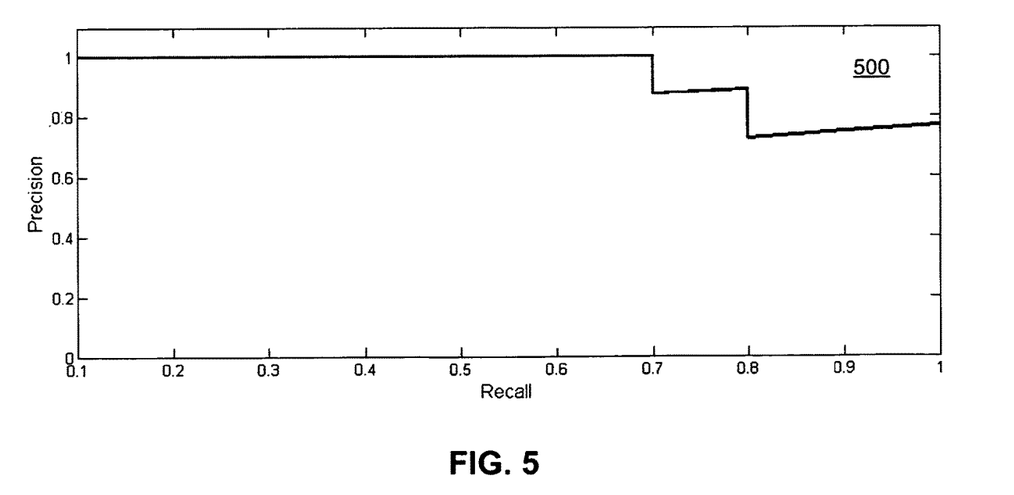
FIG. 5 is a chart showing precision versus recall for a ground truth including ten services from manual ranking in accordance with an exemplary embodiment of the present invention.

The results are further analyzed in FIG. 5 which shows a graph 500 plotting the precision versus recall. This plot assumes that the top 10 services in the manual rank column are relevant to the needs expressed in the requirement document. This is likely to be over-optimistic since an enterprise is likely to take the list of 17 services and put them through a qualification process and create a shortlist of vendors to whom requirements will be sent in future as part of a request for quote. Ideally, that shortlist should be the ground truth for calculating precision and recall. We assume that the top 10 services in the manual rank column will be fairly representative of the shortlist that an enterprise may generate if provided with these 17 services in response to requirement documents that are related to marketing campaigns. We observe from this graph that we can obtain a recall of 0.7 without losing any precision.

Exemplary embodiments in accordance with the invention provide an improved description of services that is used to build a rank ordered list of service providers. This improved description of services improves the ability of service requestors to engage with the service providers. For example, a service requestor can learn that a printer service provider needs "paper weight" specified in order to provide a quote cuts down the length of the engagement cycle. The improved description also provides a new input that can be iterated again through the process.

Figure 6:
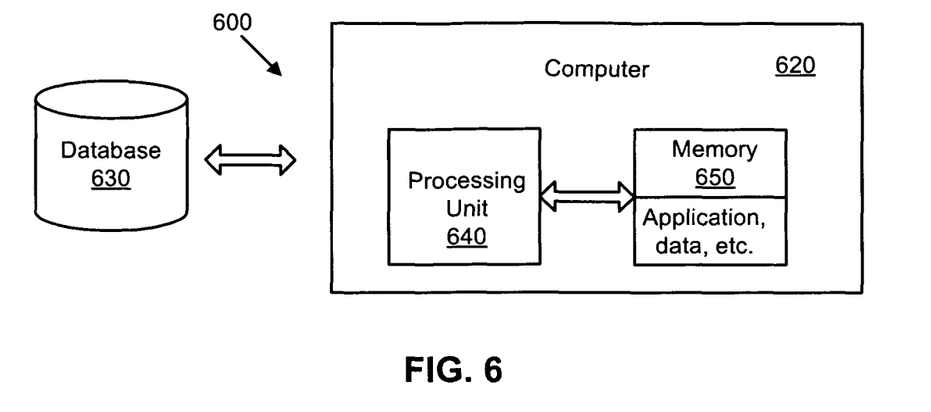
FIG. 6 is a computer system for implementing methods in accordance with an exemplary embodiment of the present invention.

FIG. 6 is a computer system 600 for implementing methods in accordance with an exemplary embodiment of the present invention.

The computer system 600 includes a computer 620 coupled to storage devices 630, such as a database. The computer 620 comprises a processing unit 640 (such as one or more processors of central processing units, CPUs) for controlling the overall operation of memory 650 (such as random access memory (RAM) for temporary data storage and read only memory (ROM) for permanent data storage) and one or more algorithms or programs (such as algorithms and/or programs to implement methods in accordance with exemplary embodiments). The memory 650 stores data, control programs, and other data associate with the computer 620.

Embodiments in accordance with the present invention are not limited to any particular type or number of storage devices and/or computer. The computer system, for example, includes various portable and non-portable computers and/or electronic devices. Exemplary computer include, but are not limited to, servers, main frame computers, distributed computing devices, laptops, and other electronic devices and systems whether such devices and systems are portable or non-portable.

Definitions

As used herein and in the claims, the following words are defined as follows:

The term "service provider" is a business or entity that delivers services over the web and describes its service capabilities via web pages.

A "user" or "requester" or "customer" is human, entity, machine, computer, or program. In some embodiments, they request, describe, and define the service requirements and ultimately select the service provider.

The term "web" means the World Wide Web.

The term "web form" is a form on a web page that allows a user to enter-data that is sent to a server for processing. Web forms resemble paper forms and enable internet users the ability to electronically fill out the forms using, for example, checkboxes, radio buttons, menus, etc. Web forms are used to enter information (such as personal information and product and service request information) to enable the service provider to perform the requested service.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer system, comprising:
   analyzing an initial description of services provided by a service requestor to identify a first set of key terms;
   searching a public network with the first set of key terms to discover web sites of service providers offering services associated with the first set of key terms;
   crawling the web sites to extract information on services offered by the service providers;
   identifying web forms for the service requestor to initiate a business with the service providers from the extracted information, wherein each respective web form of the identified web forms is associated with a corresponding service provider of the service providers, and includes questions asked by the corresponding service provider;
   developing filtered information based on comparing the identified web forms and finding common words in the identified web forms;
   transforming the initial description into an improved description of services based on a comparison of data included in the filtered information; and
   applying the improved description in:
      identifying a second set of key terms;
      searching the public network to discover further web sites of further service providers offering services associated with the second set of key terms;
      crawling the further web sites to extract information on services offered;
      identifying further web forms for the service requestor to initiate a business with the further service providers from the extracted information of the further web sites, and developing filtered information based on the identified further web forms.

2. The method of claim 1, wherein searching the public network with the first set of key terms includes providing the first set of key terms to a search engine that discovers the web sites responsive to the first set of key terms.

3. The method of claim 1, wherein analyzing the initial description of services to identify the first set of key terms comprises employing singular value decomposition (SVD).

4. The method of claim 1, wherein analyzing the initial description of services to identify the first set of key terms comprises employing statistical learning and cross-correlation.

5. The method of claim 1, wherein analyzing the initial description of services to identify the first set of key terms comprises identifying terms within the initial description of services, determining a frequency at which the identified terms occur within the initial description of services, and identifying key terms based on the frequencies at which the identified terms occur within the initial description of services.

6. The method of claim 1, wherein analyzing the initial description of services to identify the first set of key terms comprises using terms identified from analyzing the initial description of services to identify and retrieve a plurality of past description of services documents having descriptions of services associated with the terms, and further analyzing the descriptions of services of the past description of services documents to determine the first set key terms.

7. The method of claim 1, wherein transforming the initial description of services includes identifying commonalities across filtered information from the service providers, presenting the service requestor with differences between the initial description of services and a summary of the commonalities, and revising the initial description of services based on the differences to provide the improved description of services.

8. A computer, comprising:
   a processor; and
   a non-transitory storage medium storing instructions executable on the processor to:
      analyze an initial description of services provided by a service requestor to identify a first set of key terms in the initial description of services,
      search for web sites of web service providers with the first set of key terms,
      crawl the web sites to extract information on services offered by the web service providers,
      identify web forms for the web service requestor to initiate a business with the web service providers from the extracted information, wherein each respective web form of the identified web forms is associated with a corresponding web service provider of the web service providers, and includes questions asked by the corresponding web service provider,
      develop filtered information based on comparing the identified web forms and finding common words in the identified web forms that include questions asked by the web service providers,
      receive an improved description of services produced by transforming the initial description of services based on the filtered information, and
      apply the improved description to:
         identify a second set of key terms;
         search the public network to discover further web sites of further web service providers offering services associated with the second set of key terms;
         crawl the further web sites to extract information on services offered;
         identify further web forms for the service requestor to initiate a business with the further web service providers from the extracted information of the further web sites, and developing filtered information based on the identified further web forms.

9. The computer of claim 8, wherein finding the common words in the identified web forms comprises finding words used by a majority of the web service providers.

10. The computer of claim 8, wherein finding the common words comprises finding common questions used by a majority of the web service providers.

11. A non-transitory computer readable storage medium having instructions for causing a computer to:
 analyze a first description of web services provided in a description of services document from a service requestor to identify a first set of key terms in the description of services document;
 provide the first set of key terms to a search engine to discover web sites of web service providers offering web services associated with the first set of key terms;
 crawl the web sites to extract information on web services offered by the web service providers;
 identify web forms for the service requestor to initiate a business with the web service providers from the extracted information, wherein each respective web form of the identified web forms is associated with a corresponding web service provider of the web service providers, and includes questions asked by the corresponding web service provider;
 develop filtered information based on comparing the identified web forms and finding common words in the identified web forms;
 receive an improved description of web services offered by the web service providers produced by transforming the first description of web services based on the filtered information; and
 apply the improved description of web services offered by the web service providers comprising:
  analyzing the improved description of web services to identify a second set of key terms;
  searching a network with the second set of key terms to discover further web sites of further web service providers offering web services associated with the second set of key terms;
  crawling the further web sites to extract information on web services offered by the further web service providers;
  identifying further web forms for the service requestor to initiate a business with the further web service providers from the extracted information of the further web sites, and developing filtered information based on the identified further web forms.

12. The non-transitory computer readable storage medium of claim 11, wherein the instructions are to cause the computer to further present the service requestor with differences between the first description of web services and the filtered information on web services offered by the web service providers.

13. The non-transitory computer readable storage medium of claim 11, wherein finding the common words comprises finding common questions asked in the identified web forms.

* * * * *